(12) United States Patent
Mark et al.

(10) Patent No.: US 11,685,540 B2
(45) Date of Patent: Jun. 27, 2023

(54) METHODS AND SYSTEMS FOR POWER MANAGEMENT OF A HYBRID ELECTRIC POWERPLANT

(71) Applicant: PRATT & WHITNEY CANADA CORP., Longueuil (CA)

(72) Inventors: Michael R. Mark, Montreal (CA); Leonid Guerchkovitch, Dollard-des-Ormeaux (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 132 days.

(21) Appl. No.: 17/155,582

(22) Filed: Jan. 22, 2021

(65) Prior Publication Data

US 2022/0234748 A1 Jul. 28, 2022

(51) Int. Cl.
*B64D 31/06* (2006.01)
*B64D 27/02* (2006.01)

(52) U.S. Cl.
CPC ......... *B64D 31/06* (2013.01); *B64D 27/02* (2013.01); *B64D 2027/026* (2013.01)

(58) Field of Classification Search
CPC .............................................. B64D 2027/026
See application file for complete search history.

(56) References Cited

U.S. PATENT DOCUMENTS

| | | |
|---|---|---|
| 2006/0041343 A1 | 2/2006 | Zaremba et al. |
| 2009/0132108 A1 | 5/2009 | Seel et al. |
| 2014/0117148 A1 | 5/2014 | Dyrla et al. |
| 2018/0354635 A1* | 12/2018 | Wagner ............... F02K 5/00 |
| 2020/0277064 A1 | 9/2020 | Thomassin et al. |
| 2020/0277072 A1* | 9/2020 | Zoppitelli ............ B64C 27/08 |
| 2020/0347743 A1 | 11/2020 | Long et al. |
| 2022/0081122 A1* | 3/2022 | Gazzino ............... B64C 27/12 |

FOREIGN PATENT DOCUMENTS

DE 102010047016 A1 4/2012

OTHER PUBLICATIONS

European Patent Office, Communication re. extended European search report for European patent application No. 22153036.3, dated May 24, 2022.

* cited by examiner

*Primary Examiner* — Nicholas McFall
(74) *Attorney, Agent, or Firm* — Norton Rose Fulbright Canada LLP

(57) ABSTRACT

Methods and systems for method for managing a hybrid-electric powerplant (HEP) comprising a thermal engine and an electric motor are described. The method comprises transmitting a thermal power command to the thermal engine to generate a thermal power output; transmitting an electric power command to the electric motor to generate an electric power output; comparing the thermal power output to the thermal power command and the electric power output to the electric power command; detecting a fault when the thermal power output deviates from the thermal power command or when the electric power output deviates from the electric power command; and accommodating the fault by modulating the thermal power command in response to a deviation in the electric power output and modulating the electric power command in response to a deviation in the thermal power output.

17 Claims, 5 Drawing Sheets

METHODS AND SYSTEMS FOR POWER MANAGEMENT OF A HYBRID ELECTRIC POWERPLANT

TECHNICAL FIELD

The disclosure relates generally to power management and, more particularly, to power management of a hybrid electric powerplant having an electric motor and a thermal engine.

BACKGROUND OF THE ART

Hybrid electric powerplants combine combustion and electric propulsion technologies. In an electric propulsion system for an aircraft, electrical energy is converted to mechanical energy by an electric motor to drive a rotor, such as a prolusion fan or a propeller. There are environmental and cost benefits to having at least a portion of the power for an aircraft propulsion system come from electric motors.

While existing power management systems for hybrid electric powerplants are suitable for their purposes, improvements are desired.

SUMMARY

In one aspect, there is provided a method for managing a hybrid-electric powerplant (HEP) comprising a thermal engine and an electric motor are described. The method comprises receiving a total power request for the HEP and determining, from the total power request, a thermal power request and an electric power request; converting the thermal power request into a thermal power command and the electric power request into an electric power command; transmitting the thermal power command to the thermal engine to generate a thermal power output; transmitting the electric power command to the electric motor to generate an electric power output; comparing the thermal power output to the thermal power command and the electric power output to the electric power command; detecting a fault when the thermal power output deviates from the thermal power command by more than a first threshold or when the electric power output deviates from the electric power command by more than a second threshold; and accommodating the fault by modulating the thermal power command in response to the electric power output deviating from the electric power command by more than the first threshold and modulating the electric power command in response to the thermal power output deviating from the thermal power command by more than the second threshold.

In another aspect, there is provided a power management system for a hybrid-electric powerplant (HEP) comprising a thermal engine and an electric motor. The power management system comprises at least one controller having at least one processor and a memory coupled thereto, the memory having stored thereon program instructions. The program instructions are executable by the processor for receiving a total power request for the HEP and determining, from the total power request, a thermal power request and an electric power request; converting the thermal power request into a thermal power command and the electric power request into an electric power command; transmitting the thermal power command to the thermal engine to generate a thermal power output; transmitting the electric power command to the electric motor to generate an electric power output; comparing the thermal power output to the thermal power command and the electric power output to the electric power command; detecting a fault when the thermal power output deviates from the thermal power command by more than a first threshold or when the electric power output deviates from the electric power command by more than a second threshold; and accommodating the fault by modulating the thermal power command in response to the electric power output deviating from the electric power command by more than the first threshold and modulating the electric power command in response to the thermal power output deviating from the thermal power command by more than the second threshold.

The features described herein may be used together in any combination.

DESCRIPTION OF THE DRAWINGS

Reference is now made to the accompanying figures in which.

DETAILED DESCRIPTION

The present disclosure is directed to power management for a hybrid-electric powerplant (HEP), such as those used in an aircraft propulsion system. On a traditional thermal engine, there is only one source of power. In the event of a fault affecting power output from the thermal engine or its associated control, there is no way to supplement power. With an HEP, power deviations from one power source may be mitigated by increasing or decreasing the power output from the other power source to accommodate the fault.

Figure 1:
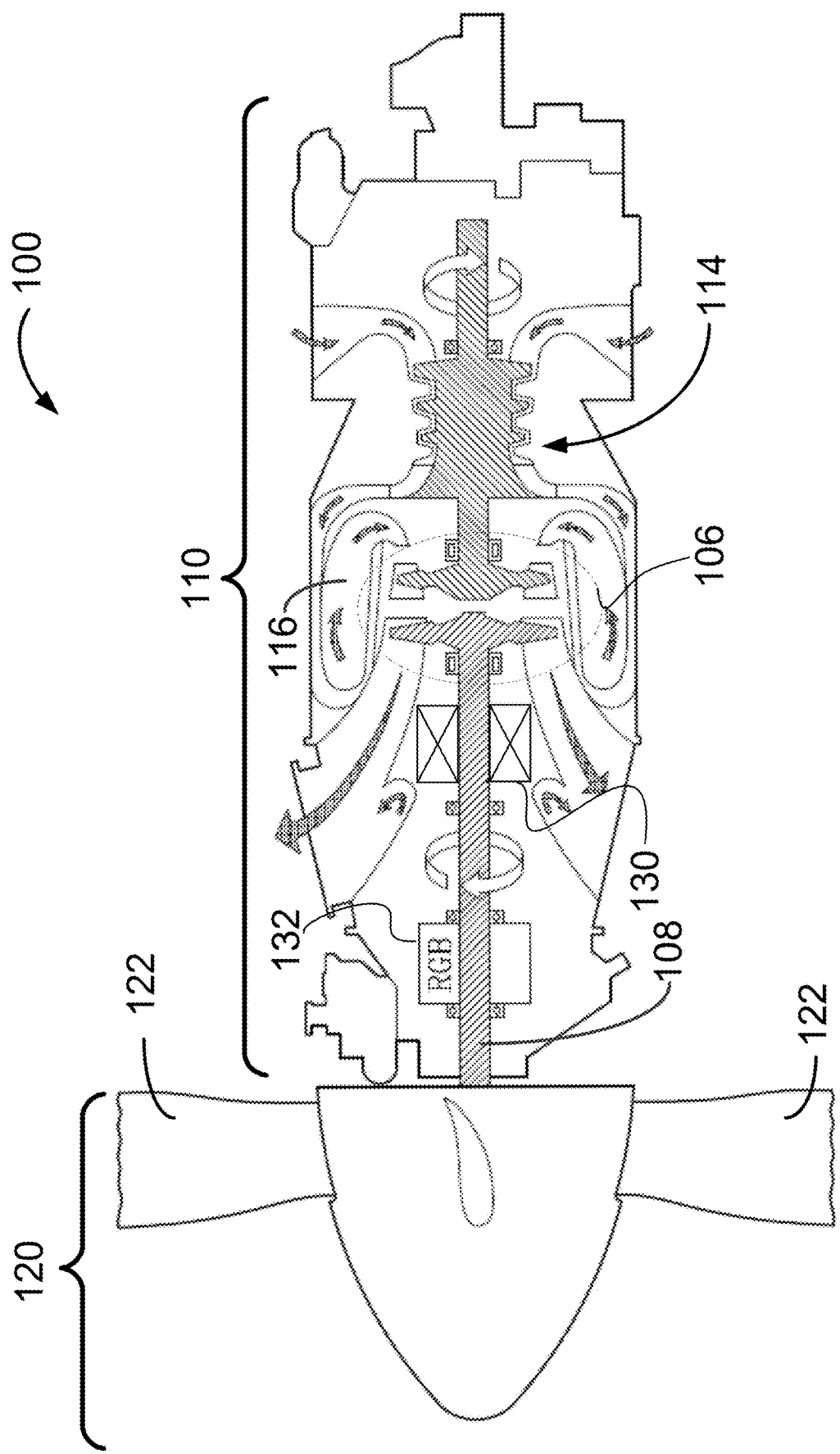
FIG. 1 is a schematic cross sectional view of a hybrid electric powerplant.

An example HEP 100 is shown in FIG. 1 and generally comprises a thermal engine 110, an electric motor 130 and a propeller 120. The thermal engine 110 is, in this example, a combustion engine, and more particularly a turbine turboprop engine. Other types of combustion engines, such as turboshaft, turbofan turbine engines, and internal combustion engines, may also apply. Generally, the thermal engine 110 may be any system that converts heat or thermal energy to mechanical energy which can then be used to drive a load, such as the propeller 120. The load can also be a fan, rotor system, and the like. The electric motor 130 may be any type of electric motor, including an electric machine that can be driven as a motor or as a generator.

The propeller 120 is attached to a shaft 108 through which ambient air is propelled. There is provided in serial flow communication a compressor section 114 for pressurizing the air, a combustor 116 in which the compressed air is mixed with fuel and ignited for generating an annular stream of hot combustion gases, and a turbine section 106 for extracting energy from the combustion gases driving the rotation of the propeller through the shaft 108. The propeller 120 converts rotary motion from the shaft 108 of the engine 110 to provide propulsive force for the aircraft, also known as thrust. The propeller 120 may be a variable-pitch propeller capable of generating forward and reverse thrust and comprises two or more propeller blades 122. For a propeller-driven propulsion system, the thermal engine 110 drives the propeller 120 via a reduction gear box (RGB) 132.

Also coupled to the RGB 132 is the electric motor 130, which uses electricity to provide power that is converted to thrust via the RGB 132 towards the propeller 120. The HEP 100 thus includes two power sources, namely the electric motor 130 and the thermal engine 110, whose power is combined through the RGB 132 and used to drive the load (i.e. propeller 120). While the thermal engine 110 and the electric motor 130 are shown in this example to be coupled to the propeller 120 through the RGB 132, other configurations are also contemplated. For example, in a pusher-puller configuration, a propulsion unit having a thermal engine and an electric motor may be coupled to one or more loads without a gear box.

Figure 2:
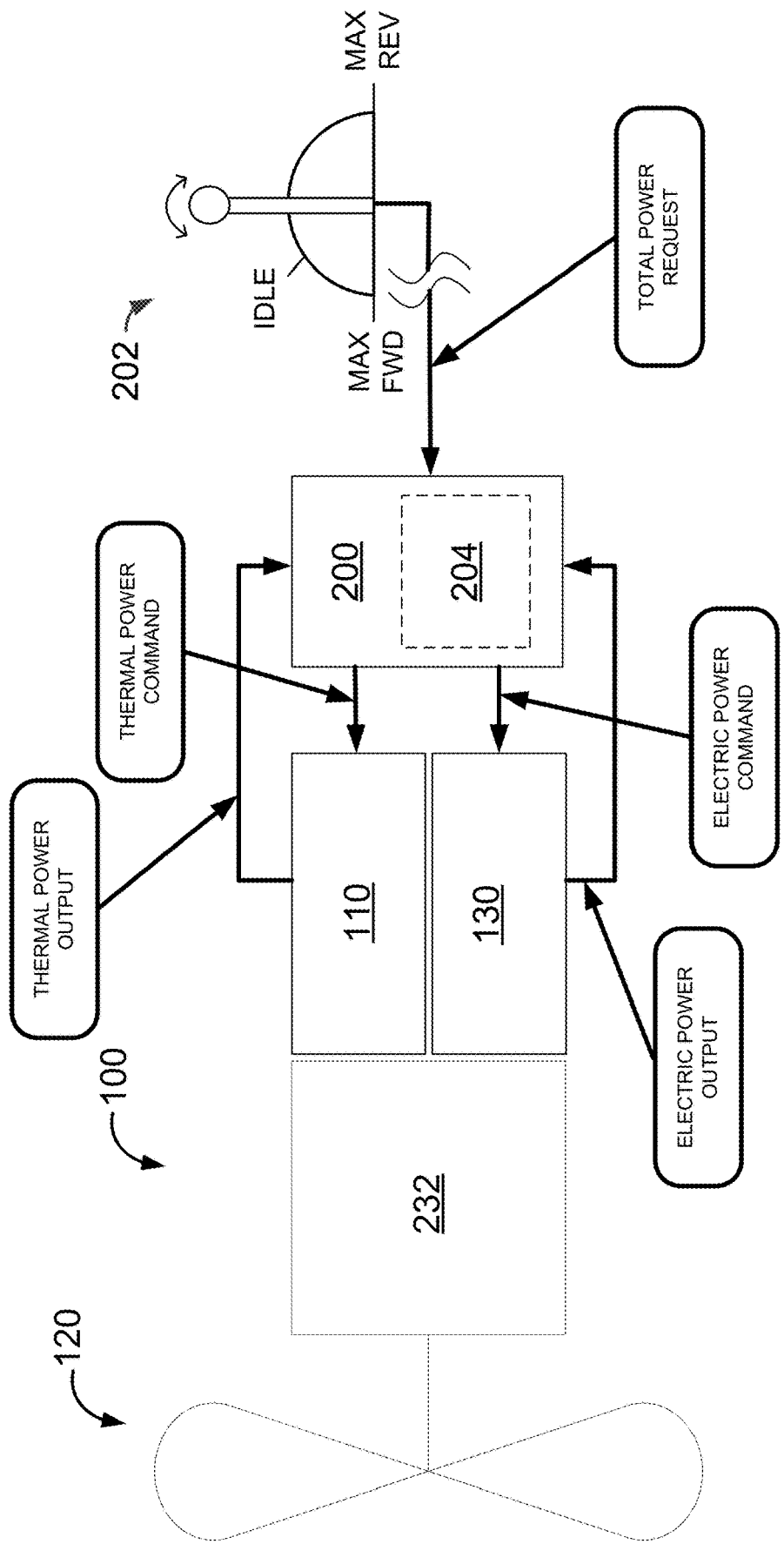
FIG. 2 is a block diagram of the hybrid electric powerplant and power management system.

Referring to FIG. 2, a power management system 200 is coupled to the HEP 100, which includes the thermal engine 110, electric motor 130, and a combining gearbox 232 (which can also provide the mechanical speed reduction typically provided by the reduction gearbox 132). A power request is received, for example from a power throttle 202 in an aircraft cockpit, at the power management system 200. The power throttle 202 may be a power lever or a collective lever, and may provide a power lever angle or throttle lever angle representative of the power request. In some embodiments, the total power request may come from another aircraft or avionic system, or from an engine system or controller. For example, the power request may be sent from the power throttle 202 to another system which may then provide the information to the power management system 200. The power management system 200 converts the total power request into an electric power request and a thermal power request in accordance with a desired proportion of electric power and thermal power. The electric power request and thermal power requests are then converted into an electric power command and a thermal power command, respectively, which are used to drive the electric motor 130 and thermal engine 110, respectively. It will be understood that the breakdown between thermal power and electric power may vary anywhere between 0% to 100% for either power source.

In some embodiments, two separate power lanes are provided from the power management system 200 to the HEP 100, one for the thermal power command and one for the electric power command, and are referred to herein as the thermal power lane and the electric power lane, respectively. The actual power output by the HEP 100 for each power source is provided to the power management system 200. The power management system 200 is configured to detect faults that have the potential to affect the power command or power output to a given power lane by comparing a given power command to an actual output power. A fault in the electric power lane is detected when the electric power output deviates from the electric power command by more than a first threshold. A fault in the thermal power lane is detected when the thermal power output deviates by the thermal power command by more than a second threshold. The first and second thresholds may be the same or different, taking into account the differences between the thermal engine 110 and the electric motor 130. The fault may be confirmed using a timer, i.e. the deviation is maintained for a predetermined time.

In the event of a fault in one of the two power lanes, the power management system 200 is configured to modulate the power command of the unfaulted power lane to accommodate the fault. For example, if the thermal power output is higher than it should be based on the thermal power command, the electric power command may be reduced to account for the deviation in the thermal power command or output. The electric motor 130 may provide a braking force to reduce the total power output by the HEP 100, or consume excess power to recharge batteries. In some embodiments, it may be sufficient to simply reduce the electric power command. Similarly, if the thermal power output is lower than it should be based on the thermal power command, the electric power command may be increased to account for the deviation in the thermal power command or output. If the electric power output deviates from the electric power command by more than a threshold, the thermal power command may be modulated to accommodate the fault by providing more or less thermal power output in accordance with the deviation of the electric power command or output. The ability to accommodate the fault in the faulted power lane through the unfaulted power lane may depend on a variety of circumstances, such as ambient conditions, aircraft operating conditions, powertrain operating conditions, power lane operating conditions, and the like.

In some embodiments, the power management system 200 is implemented within a single controller 204. The controller may be multi channel or single channel, each channel having one or more processor, each processor having one or more core. Various functions of the system 200 may be split across channels and/or processors and/or cores. For example, a first channel may convert the thermal power request to a thermal power command while a second channel may convert the electric power request to an electric power command. Similarly, a first processor or first core may convert the thermal power request to a thermal power command while a second processor or core may convert the electric power request to an electric power command. Fault detection and fault accommodation may be provided in a same or separate channel, processor, and/or core.

Figure 3:
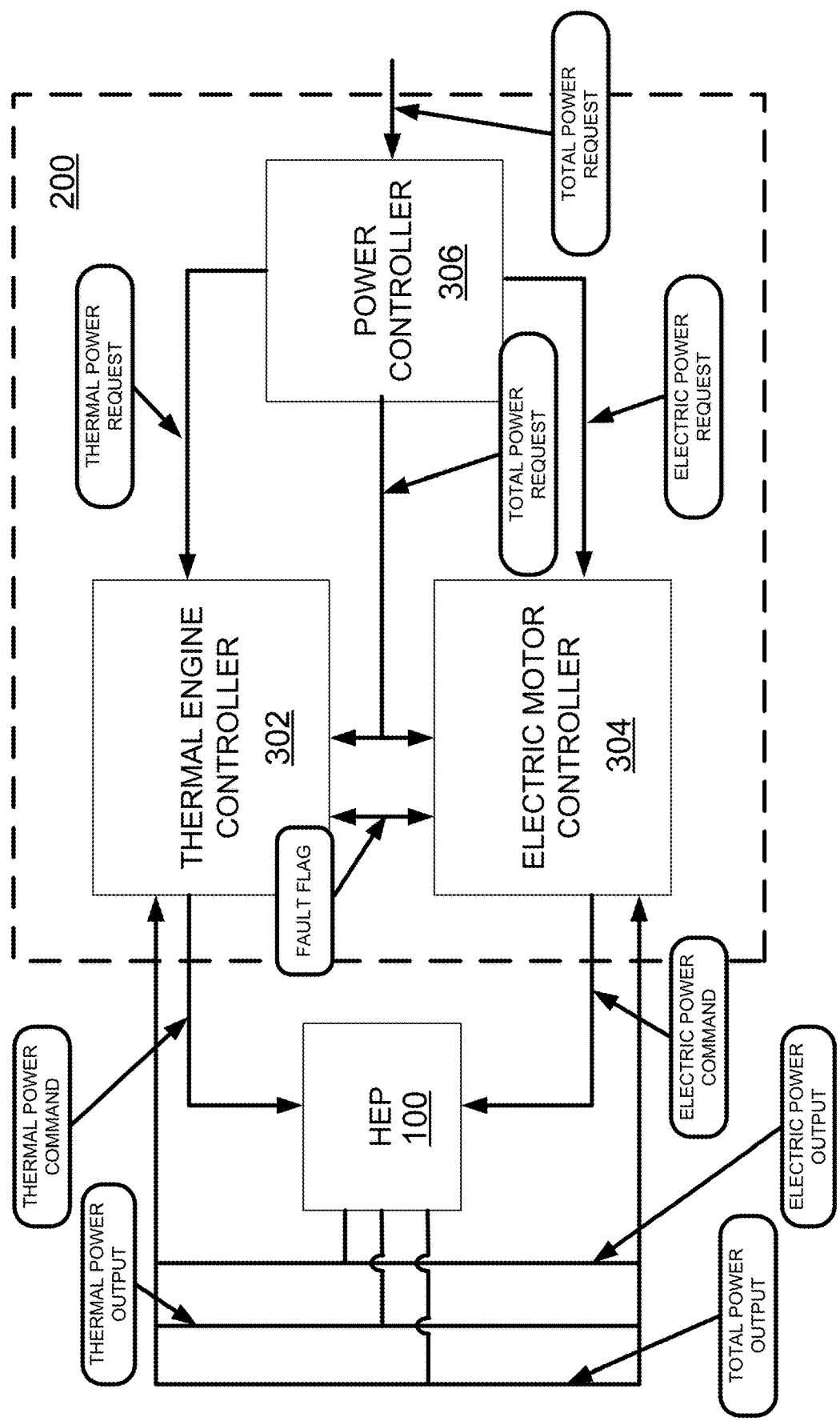
FIG. 3 is a block diagram of an example embodiment of the power management system.

In some embodiments, and as illustrated in the example of FIG. 3, the power management system 200 comprises a first controller and a second controller, with each controller dedicated to one of the thermal engine 110 and the electric motor 130. A thermal engine controller 302 receives the thermal power request and determines the thermal power command based on the thermal power request. In some embodiments, other parameters such as aircraft parameters, thermal engine parameters, and ambient operating conditions may be used to determine the thermal power command. Examples of aircraft parameters include but are not limited to flight phase, aircraft weight, fuel status, battery state of charge, weight on wheels, flap setting, and secondary system requests (e.g. bleed system, hydraulic drive system, electrical power generation system). Examples of engine parameters include but are not limited to temperature, rotational speed, pressure, fuel rate, output torque, and internal system operating conditions. Examples of ambient operating conditions include but are not limited to outside air temperature, altitude, Mach number, calibrated air speed, and ambient pressure. An electric motor controller 304 receives the electric power request and determines the electric power command based on the electric power request. In some embodiments, other parameters such as the aircraft parameters, electric motor parameters, and the ambient operating conditions may be used to determine the thermal power command. Examples of the electric motor parameters include but are not limited to voltage, current, torque, speed, power factor, efficiency, internal temperature, and internal resistance.

In some embodiments, a third controller is provided in the power management system 200 for converting the total power request into the thermal power request and the electric power request. For example, a power controller 306 may be found upstream from the thermal engine controller 302 and the electric motor controller 304 to perform this function. Alternatively, the power controller 306 may form part of the thermal engine controller 302 or the electric motor controller 304 instead of being provided separately therefrom.

As stated above, fault detection is performed by comparing an actual power output to a corresponding power command for a given power source. In some embodiments, each controller 302, 304 is configured to perform fault detection for its own power lane in a form of self-diagnosis. For example, the thermal engine controller 302 may receive the thermal power output from the HEP 100 and compare the thermal power output to its own thermal power command to detect a fault. Similarly, the electric motor controller 304 may receive the electric power output from the HEP 100 and compare the electric power output to its own electric power command to detect a fault. Upon detection of a fault, the controller 302, 304 that detects the fault may send a fault flag to the other controller 302, 304. This may be used as a flag to determine if fault accommodation should be performed, especially during critical flight phases. Fault accommodation would then be performed by the controller 302, 304 having an unfaulted power lane.

Alternatively or in combination therewith, each controller 302, 304 is configured to perform fault detection for the other controller 302, 304. For example, the electric motor controller 304 may compare the thermal power output to the thermal power command. The thermal power command may be provided to the electric motor controller 304 by the power controller 306 or by the thermal engine controller 302. Alternatively, the electric motor controller 304 may calculate the thermal power command based on the thermal power request, which it may receive from the power controller 306 or the thermal engine controller 302. Also alternatively, the electric motor controller 304 may calculate the thermal power request based on the electric power request and the total power request, which it may receive from the power controller 306 or the thermal engine controller 302. Any one of the total power request, the thermal power request, and the electric power request may be calculated by either controller 302, 304 based on the other two of these. Any one of the total power output, the electric power output, and the thermal power output may be calculated by either controller 302, 304 based on the other two of these. Therefore, it will be understood that the embodiment illustrated in FIG. 3 is merely an example and other embodiments may also apply.

The controller 302, 304 of the unfaulted power lane may consider the total power request to modulate its own power command once a fault has been detected. For example, the controller 302, 304 may modulate its own power command so as to generate the total power requested. The controller 302, 304 may also consider additional factors to determine how much of the total power request it should generate as it accommodates the fault in the faulted power lane. For example, fuel consumption rate, remaining fuel level, and remaining distance to travel may be considered by the thermal engine controller 302, while battery state of charge may be considered by the electric motor controller 304. There may be specific settings for each controller that dictate how to modulate its own power command when accommodating a fault in a power lane. For example, there may be a setting to enable modulation of the power command during certain phases of flight of the aircraft. There may be a setting to disable or limit modulation of the power command in certain circumstances, such as in certain areas of the flight envelope where it may be unsafe to do so, such as takeoff and go-around. Power modulation may be limited to only reducing an own power command, or to increasing by no more than a certain percentage of an original power command. In some embodiments, an enablement/disablement signal may be received from a pilot commanded switch in a cockpit of the aircraft. Other embodiments are also contemplated depending on practical implementation.

Figure 4:
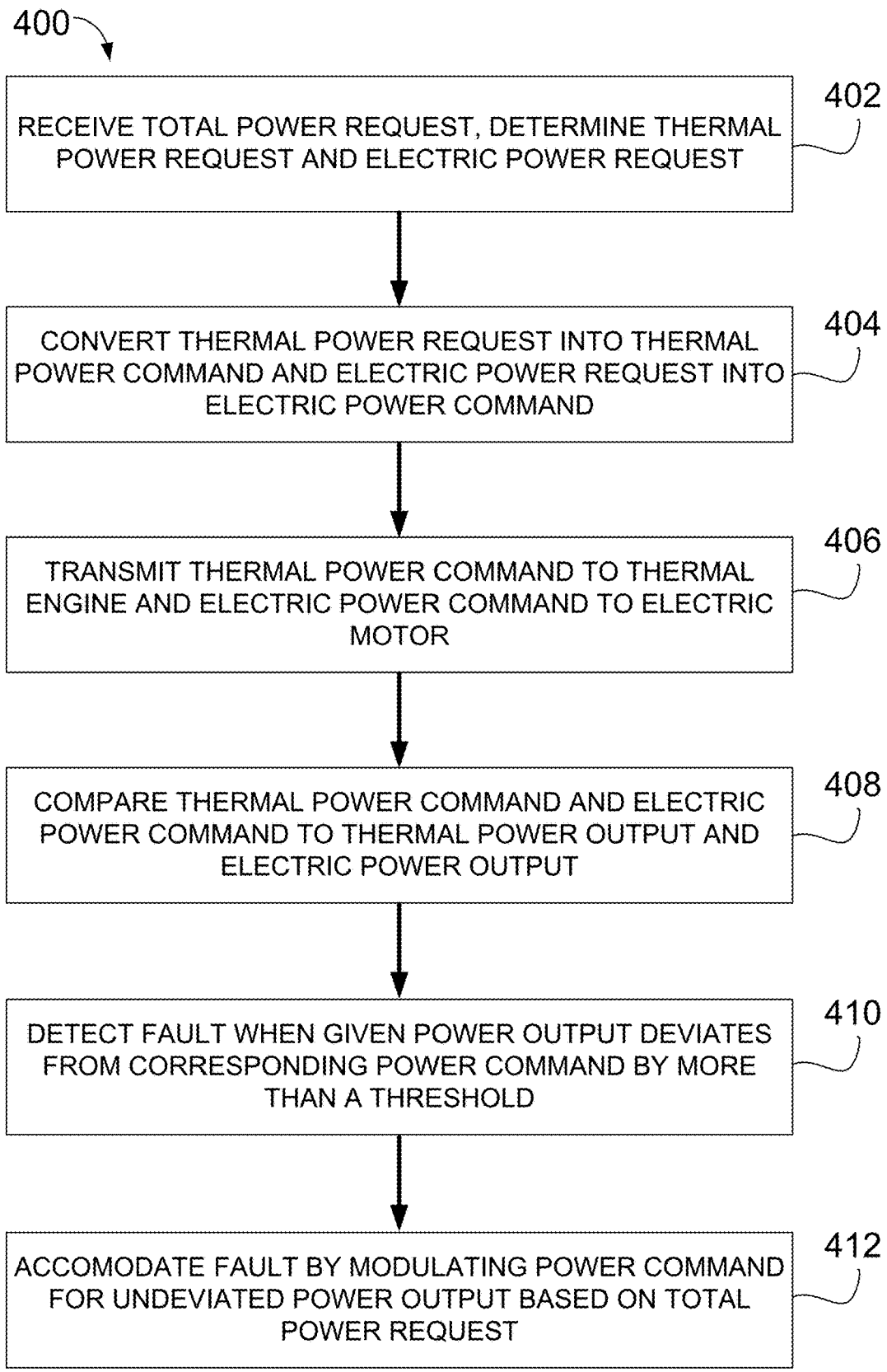
FIG. 4 is a flowchart an example method of power management for a hybrid electric powerplant.

With reference to FIG. 4, there is illustrated a method 400 for managing an HEP comprising a thermal engine and an electric motor, as performed by the power management system 200 of FIG. 2 or 3. At step 402, the total power request is received and the thermal power request and electric power request are determined based on the total power request. In some embodiments, a pre-determined breakdown is used to determine the thermal power request and electric power request. Alternatively, various parameters may be used to determine the breakdown. At step 404, the thermal and electric power requests are converted into respective power commands. Various aircraft, engine and operating conditions may be used for this conversion. At step 406, the thermal and electric power commands are transmitted to the thermal engine and electric motor of the HEP, respectively.

At step 408, the power management system 200 compares the thermal power output by the thermal engine to the thermal power command, and compares the electric power output by the electric motor to the electric power command. At step 410, a fault is detected when the thermal power output deviates from the thermal power command by more than a first threshold or when the electric power output deviates from the electric power command by more than a second threshold. In response to detecting the fault, the power command for one of the two power sources is modulated at step 412. More specifically, the thermal power command is modulated in case of an electric power output deviation and the electric power command is modulated in case of a thermal power output deviation.

As stated above, various architectures are contemplated for the power management system 200, including having a single controller, dedicated power source controllers (i.e. one for the thermal engine and one for the electric motor), and three controllers (as per FIG. 3). In an architecture having at least two controllers, each power source controller may detect a fault in itself and/or in the other controller. Faults may be flagged by the controller detecting the fault to the other controller(s). Each controller may be configured to determines how it can reduce a total power output by the HEP in response to a fault causing an increase to the total power output. Each controller may be configured to determine if it can provide additional power to meet the total power request in response to a fault causing a decrease to a total power output by the HEP. In some embodiments, the power management system functions are contained entirely within the thermal engine controller 302 or the electric motor controller 304.

Power modulation may be capped or limited in one direction, i.e. up or down. Power modulation may be determined as a function of the total power request and/or other factors or parameters. Power modulation may be enabled and/or disabled in certain circumstances, based on flight envelope, flight phase, and other mitigating factors.

Figure 5:
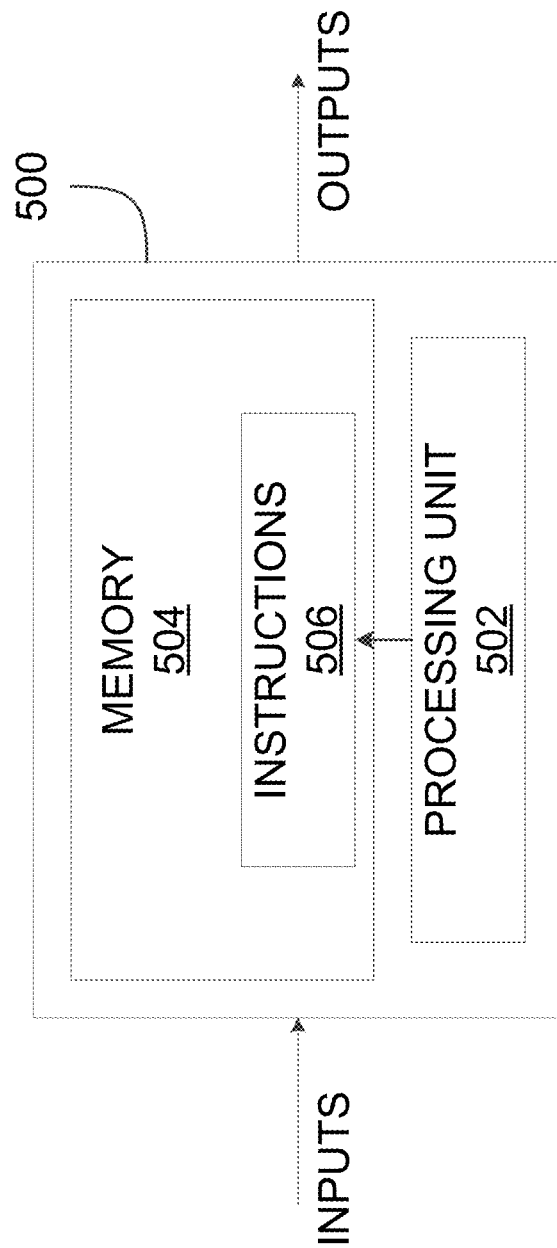
FIG. 5 is a block diagram of an example computing device.

The power management system 200 may be implemented with one or more computing device 500, an example of which is illustrated in FIG. 5. For simplicity only one computing device 500 is shown but, for example, each controller 302, 304, 306 may be implemented by one or more of the computing devices 500. The computing devices 500 may be the same or different types of devices. Note that the thermal engine controller 302 and/or power controller 306 can be implemented as part of a full-authority digital engine controls (FADEC) or other similar device, including electronic engine control (EEC), engine control unit (ECU), electronic propeller control, propeller control unit, and the like. The motor controller 304 can be implemented as part of a motor controller (MC), electric motor controller (EMC), electric powertrain controller (EPC), and the like. Other embodiments may also apply.

The computing device 500 comprises a processing unit 502 and a memory 504 which has stored therein computer-executable instructions 506. The processing unit 502 may comprise any suitable devices configured to implement the method 400 such that instructions 506, when executed by the computing device 500 or other programmable apparatus, may cause the functions/acts/steps performed as part of the method 400 as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems for power management of an HEP described herein may be implemented in a high level procedural or object oriented programming or scripting language, or a combination thereof, to communicate with or assist in the operation of a computer system, for example the computing device 500. Alternatively, the methods and systems for power management may be implemented in assembly or machine language. The language may be a compiled or interpreted language. Program code for implementing the methods and systems for power management may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for power management may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, modulation of the power command may be enabled upon detection of an uncontrolled high thrust (UHT) event, to decrease the total power output by the HEP 100. Yet further modifications could be implemented by a person of ordinary skill in the art in view of the present disclosure, which modifications would be within the scope of the present technology.

The invention claimed is:

1. A method for managing a hybrid-electric powerplant (HEP) comprising a thermal engine and an electric motor, the method comprising:
receiving a total power request for the HEP and determining, from the total power request, a thermal power request and an electric power request;
converting the thermal power request into a thermal power command and the electric power request into an electric power command;
transmitting the thermal power command to the thermal engine to generate a thermal power output;
transmitting the electric power command to the electric motor to generate an electric power output;
comparing the thermal power output to the thermal power command and the electric power output to the electric power command;
detecting a fault when the thermal power output is greater than the thermal power command; and
accommodating the fault by modulating the electric power command to provide a braking force using the electric motor to reduce a total power output from the HEP in response to the thermal power output being greater than the thermal power command.

2. The method of claim 1, wherein the thermal power request is converted into the thermal power command and transmitted to the thermal engine by a first controller, and the electric power request is converted into the electric power command and transmitted to the electric motor by a second controller.

3. The method of claim 2, wherein the first controller detects the fault in a first power lane associated with the second controller, and the second controller detects the fault in a second power lane associated with the first controller.

4. The method of claim 2, wherein the first controller detects the fault in a first power lane associated with the first controller, and the second controller detects the fault in a second power lane associated with the second controller.

5. The method of claim 2, wherein one of the first controller and the second controller detects the fault and flags the fault to the other of the first controller and the second controller.

6. The method of claim 1, wherein accommodating the fault comprises providing the total power request from one of the thermal engine and the electric motor.

7. The method of claim 1, further comprising enabling or disabling the accommodating of the fault as a function of a flight envelope or a flight phase.

8. A power management system for a hybrid-electric powerplant (HEP) comprising a thermal engine and an electric motor, the power management system comprising at least one controller having at least one processor and a memory coupled thereto, the memory having stored thereon program instructions executable by the at least one processor for:
receiving a total power request for the HEP and determining, from the total power request, a thermal power request and an electric power request;
converting the thermal power request into a thermal power command and the electric power request into an electric power command;
transmitting the thermal power command to the thermal engine to generate a thermal power output;
transmitting the electric power command to the electric motor to generate an electric power output;
comparing the thermal power output to the thermal power command and the electric power output to the electric power command;
detecting a fault when the thermal power output is greater than the thermal power command; and
accommodating the fault by modulating the electric power command to provide a braking force using the electric motor to reduce a total power output from the HEP in response to the thermal power output being greater than the thermal power command.

9. The power management system of claim 8, wherein the at least one controller comprises a first controller dedicated to the thermal engine and a second controller dedicated to the electric motor.

10. The power management system of claim 9, wherein the first controller provides the thermal power command to the thermal engine on a thermal power lane and the second controller provides the electric power command to the electric motor on an electric power lane.

11. The power management system of claim 9, wherein the at least one controller comprises a third controller coupled to the first controller and the second controller, the third controller configured for receiving the total power request for the HEP and determining the thermal power request and the electric power request.

12. The power management system of claim 11, wherein the third controller provides the first controller with the total power request and the thermal power request, and provides the second controller with the total power request and the electric power request.

13. The power management system of claim 11, wherein the third controller receives the total power request from a power throttle in an aircraft cockpit.

14. The power management system of claim 10, wherein the first controller is configured for detecting the fault in the thermal power lane, and the second controller is configured for detecting the fault in the electric power lane.

15. The power management system of claim 10, wherein the first controller is configured for detecting the fault in the electric power lane, and the second controller is configured for detecting the fault in the thermal power lane.

16. The power management system of claim 9, wherein the first controller and the second controller receive at least two of the thermal power output, the electric power output, and a total power output by the HEP.

17. The power management system of claim 9, wherein one of the first controller and the second controller detects the fault and flags the fault to the other of the first controller and the second controller.

* * * * *